March 10, 1942.  T. G. MYERS  2,275,680
SEALING DEVICE
Filed May 2, 1938
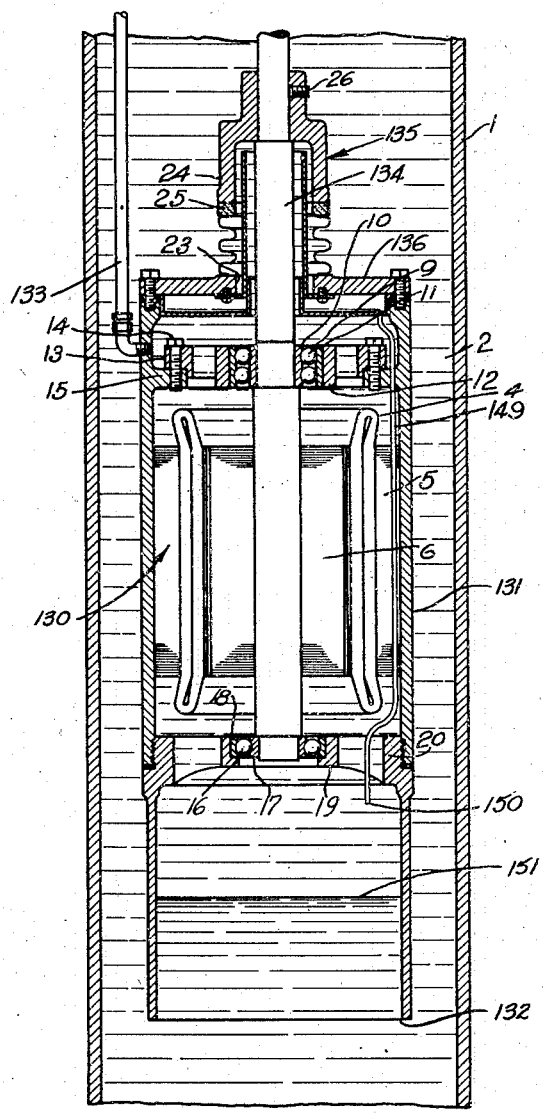
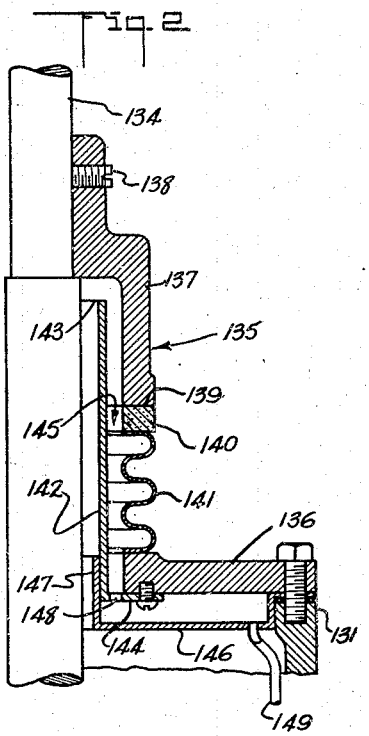
INVENTOR
Thomas G. Myers
BY John Flam
ATTORNEY Patented Mar. 10, 1942

2,275,680

UNITED STATES PATENT OFFICE 2,275,680

SEALING DEVICE

Thomas G. Myers, Los Angeles, Calif., assignor to U. S. Electrical Motors, Inc., Los Angeles, Calif., a corporation of California Application May 2, 1938, Serial No. 205,583

1 Claim. (Cl. 286—8)

This invention relates to a seal, such as for example may be used to exclude entry of well liquid into a submerged casing.

Seals intended to accomplish this result have been proposed in the past, especially for excluding well liquid from submersible electric motors, intended for supplying motive power to a pump. The windings and electrical connections of the motor must be protected against the ingress of this well liquid, which is usually water carrying large amounts of foreign matter and grit in suspension, as well as other impurities.

The motor for this purpose is arranged in a fluid tight casing. It is a relatively simple matter to render such a casing fluid tight except for the region where the motor shaft extends out of the casing. Ordinary packing glands are hopelessly inefficient, for gritty foreign matter usually rapidly wears away the sealing elements and the shaft.

The seal in the present instance includes the provision of a pair of relatively rotary metallic members contacting along a surface that surrounds the shaft. When sufficient pressure is applied for effective sealing between the surfaces, the attendant friction causes excessive wear, and often this wear is of such character that the efficacy of the seal is greatly reduced.

In spite of precautions, there is usually a small amount of water which enters around the seal, but this leakage can be easily held to a very small amount. If such leakage as occurs is prevented from contacting the working parts of the motor, long service can be assured. It is an object of this invention to provide means for returning any well liquid which may enter the motor casing around the seal to the well without its reaching the motor bearings or windings.

This invention possesses many other advantages, and has other objects which may be made more easily apparent from a consideration of several embodiments of the invention. For this purpose there are shown a few forms in the drawing accompanying and forming part of the present specification. These forms will now be described in detail, illustrating the general principles of the invention; but it is to be understood that this detailed description is not to be taken in a limiting sense, since the scope of the invention is best defined by the appended claim.

Referring to the drawing:

Figure 1 is a sectional view illustrating an embodiment of the invention in use in a well, and Fig. 2 is a fragmentary detail section of the upper portion of Fig. 1.

Referring to Figs. 1 and 2, a well casing 1 is illustrated, which is shown as filled with well liquid 2, such as water or the like. Within this well liquid 2 there is submerged a casing structure 131, for housing an electric motor 130. This electric motor is shown in this instance as having the primary windings 4 mounted in stator laminations 5 appropriately supported in the casing 3. The motor also includes a squirrel cage rotor 6 mounted upon a rotary shaft 134. This shaft 134 is shown in this instance as having an extension projecting upwardly out of the casing for direct connection to a pump (not shown).

In the present form the shaft 134 is shown as radially supported adjacent the upper end of the rotor by the aid of the ball bearing structure 9. The inner race 10 of this structure is attached to a reduced portion of shaft 134. The outer race 11 is shown as supported in a central boss 12 formed in a spider 13. This spider 13 is shown attached, as by a plurality of bolts 14, to a flange 15 extending inwardly of the casing 131.

Adjacent the lower end of the shaft the ball bearing structure 16 is provided. The inner race 17 of ball bearing 16 is fastened to a reduced portion of the shaft 134. The outer race 18 of the bearing 16 is supported in the central boss 19 of spider 20, and rests upon a shoulder formed therein. This spider 20 is shown in this instance as formed integrally with a hollow member 132 threaded into the lower end of the casing 131 and forming a fluid tight joint therewith.

The top of the casing 131 is shown as provided with the cover 136, fastened fluid tight to the upper edge of the casing 131. This cover member 136 has a large clearance aperture 23 through which the shaft 134 extends upwardly.

The motor 130 is enclosed in the oil filled casing 131 which is open to well liquid at the bottom 132. The oil filling, which may be any suitable light, neutral, lubricating liquid is supplied to the casing from a source (not shown) at the top of the well by means of pipe 133. The motor shaft 134 extends upwardly out of casing 131, a sealing arrangement 135 being provided to prevent entry of the well liquid to the casing 131 at the place where the shaft passes through the top closure member 136 of the casing. The seal comprises an inverted cup 137 secured to the shaft as by a set screw 138 and having its lower annular face 139 running in contact with the upper face of non-rotary ring 140.

This ring is preferably of some porous, wear resisting material, resiliently supported on head 136 by a Sylphon or metal bellows 141. Since the pressure of the oil filling in the casing is no greater than the pressure of the well liquid outside, it may be desirable to provide oil under greater pressure to ring 140, which can be readily done by any appropriate means.

Experiments have shown that with a seal arrangement such as the one under consideration, it is relatively easy to maintain the leakage of well liquid past the seal to a minute amount, of the order of .003 pint per 24 hours of motor operation. However, if even this small quantity is allowed to reach the motor windings, trouble will soon be experienced. Accordingly, means are provided to pass such leakage around the motor to the bottom of the casing.

A tube or sleeve 142 is placed about shaft 134 within the seal 135. The upper end 143 of the sleeve is spaced above the joint 139 of the seal, while the lower end of the sleeve has a flange 144 by which the sleeve is supported on head 136. By this means an annular chamber or well 145 is formed surrounding shaft 134 in which any liquid leaking in past seal 135 will collect. A pan 146 having a central flanged aperture 147 for shaft 134 is supported in any convenient manner at the top of casing 131 just below head 136. Since the well liquid is heavier than the liquid filling the casing, any of the former which finds its way into well 145 will settle to the bottom thereof and pass through openings 148 into pan 146, from which it is drained by tube 149. This leads past the motor and discharges at some point 150 below it, from where it passes downward through the casing filling and coalesces with the well liquid at surface 151. Thus, any well liquid is effectively prevented from reaching the motor.

It has been found that finishing operations, such as machining or lapping, on the porous metal seal rings, have the effect of burring over the surface and closing the pores so that the porosity and lubricating qualities are impaired. Accordingly, after such operations incident to obtaining a suitable surface, it is necessary to open the pores again. Thus, upon completion of the machining or lapping, the part is dipped in or otherwise subjected to an acid, such as dilute nitric acid. This eats off the parts which were burred over the pores but still leaves the surface true, and has the further advantage of loosening any small particles of lapping compound which might be in the surface, permitting them to fall out.

What is claimed is:

In a device of the charatcer described, a casing adapted to be submerged in well liquid, said casing being closed at its upper end and open to the well liquid at its lower end, a shaft extending upwardly out of the casing, said casing and shaft being relatively rotatable, sealing means between said shaft and casing, comprising a pair of contacting members respectively associated with the shaft and the casing, means forming an annular chamber about said shaft adapted to trap the leakage of well liquid past said seal, and means to return said leakage from the chamber directly to the well through said open end.

THOMAS G. MYERS.